June 19, 1928.

J. L. DROHEN 1,674,592

CIRCUIT CLOSING ATTACHMENT FOR PEDALS

Filed Dec. 10, 1926    2 Sheets-Sheet 1

J. L. Drohen
INVENTOR

BY Victor J. Evans
ATTORNEY

WITNESS:

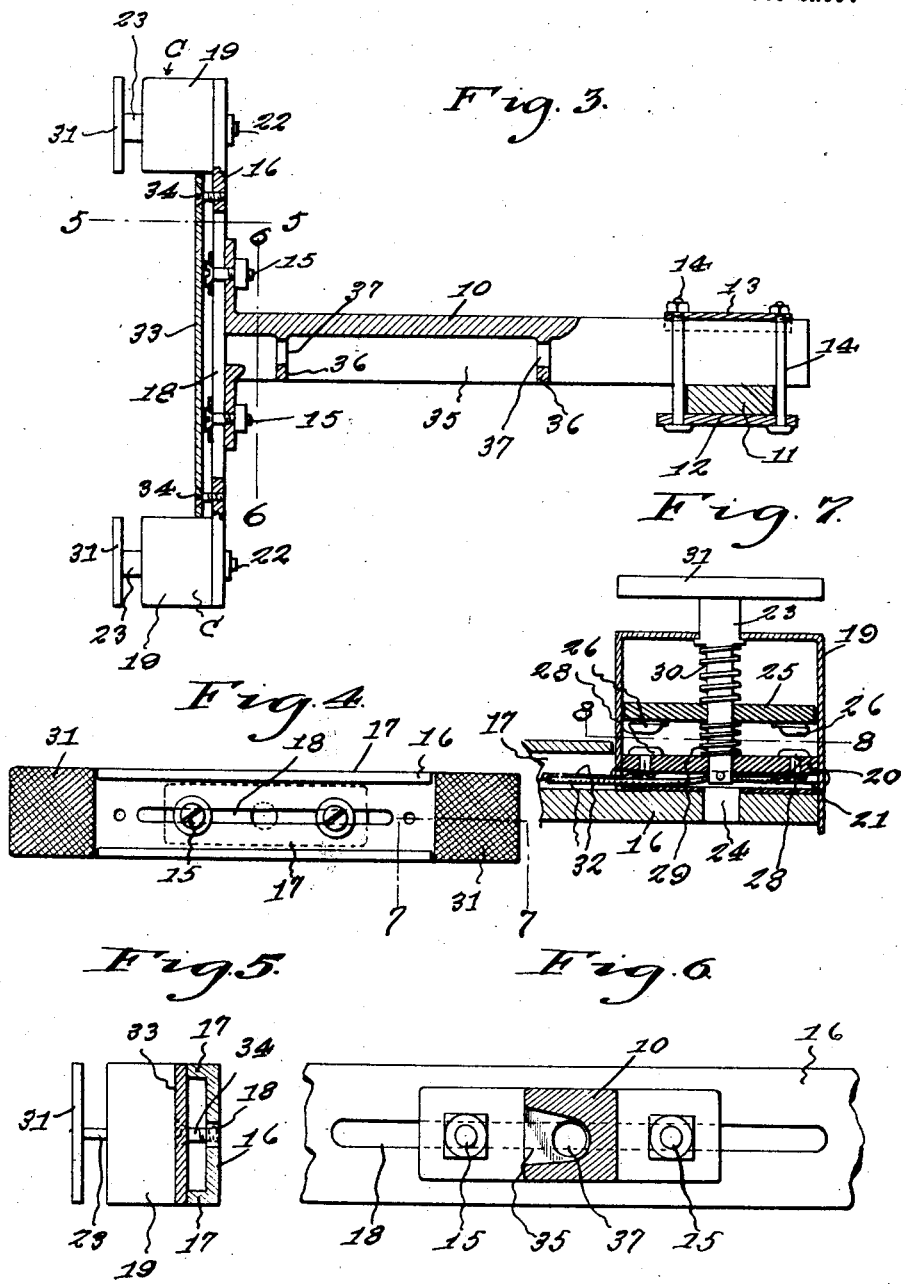

Patented June 19, 1928.

1,674,592

UNITED STATES PATENT OFFICE.

JAMES L. DROHEN, OF DUNKIRK, NEW YORK.

CIRCUIT-CLOSING ATTACHMENT FOR PEDALS.

Application filed December 10, 1926. Serial No. 153,940.

This invention relates to circuit controlling devices especially adapted for controlling direction signals for automobiles, an object being to provide a novel form of circuit closer, together with means for mounting the closer so that it may be conveniently operated by the same foot which operates the brake pedal of the automobile.

Another object of the invention is the provision of means for mounting either one or two circuit closers, whereby either one or two circuits may be independently controlled, and the brake pedal operated with or independently of the circuit controlling means, the construction providing a rest for the foot of the operator when the brake pedal is used independently of the circuit closer.

With the above and other objects in view, the invention further includes the following novel features and details of construction, to be hereinafter more fully described, illustrated in the accompanying drawings and pointed out in the appended claims.

In the drawings:—

Figure 3 is an enlarged fragmentary plan view partly in section showing the invention clamped to a foot pedal.

Figure 4 is a front elevation of the invention with the cover plate removed.

Figure 5 is a section on the line 5—5 of Figure 3.

Figure 6 is a similar view on the line 6—6 of Figure 3.

Figure 7 is an enlarged fragmentary section taken substantially on the line 7—7 of Figure 4 with the cover plate in place.

Figure 1:
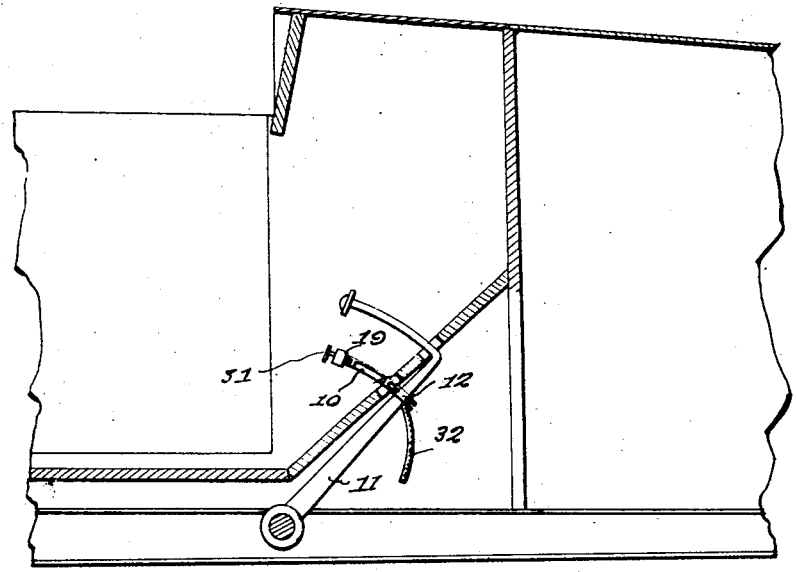
Figure 1 is a sectional view showing a fragmentary portion of an automobile with the invention in elevation.
Figure 8:
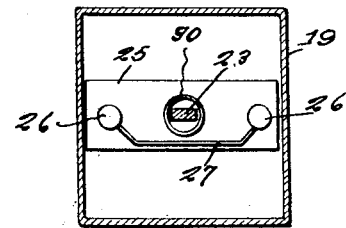
Figure 8 is a section taken substantially on the line 8—8 of Figure 7.
Figure 2:
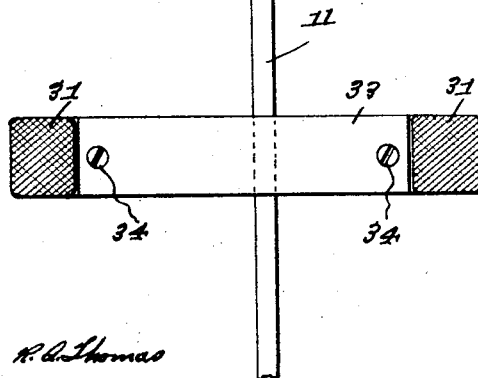
Fig. 2 is an enlarged elevation showing a portion of a foot pedal with the invention applied.
Figure 9:
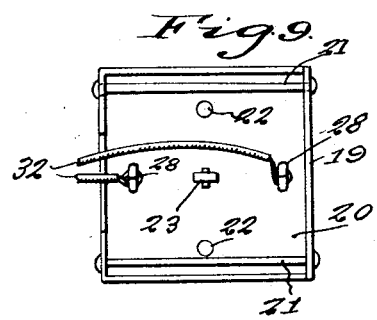
Figure 9 is a bottom plan view of one of the circuit closers removed from the foot rest.

Referring to the drawings in detail wherein like characters of reference denote corresponding parts, the invention as shown comprises a substantially T-shaped member which includes an attaching arm 10. One end of this arm is adapted to be clamped to one of the controlling members of an automobile, for example, the brake pedal 11. For this purpose, there is provided a clamp which includes a plate 12 and a plate 13, the last mentioned plate being substantially channel shaped in cross section. The plates 12 and 13 are connected by bolts 14 which extend across the attaching arm 10 and serve to securely hold the arm clamped to the pedal 11.

Secured to the opposite end of the arm by means of bolts 15, is a bar 16 which is channel shaped in cross section for the major portion of its length so as to provide spacing ribs or flanges 17. The bolts 15 pass through an elongated slot 18 provided in the bar 16 so that the latter may be adjustably positioned upon the arm 10.

Secured to opposite ends of the bar 16 is a circuit closer C which includes a housing 19. This housing carries a base 20 which is formed of insulating material and which is secured to the housing by means of pins 21, the ends of which are upset as shown. Bolts 22 extend through the base 20 and through the bar 16 and serve to detachably connect the circuit closer to the bar. Each circuit closer further includes a shank 23 which is guided in the housing 19 and whose inner end is adapted to be projected into an opening 24 provided in the bar 16. Mounted for movement on the shank 23 is a switch arm 25 which is also formed of insulating material and which carries spaced contacts 26, the latter being connected by an electric conductor 27. The contacts 26 are adapted to engage stationary contacts 28 carried by the base 20 and normally spaced therefrom by a spring 29 which surrounds the shank 26. An additional spring 30 also surrounds the shank 23 between the switch arm 25 and the end of the housing 19. This last mentioned spring is stiffer than the spring 29 so that when the shank 23 is forced inward, the spring 29 will be compressed to permit the contacts 26 and 28 to engage before compressing spring 30. This prevents damage to the closer through excess pressure. A pressure plate 31 is carried at the outer end of the shank 23.

The contacts 28 are adapted to have connected thereto conductor wires 32 and these wires are adapted to extend along the bar 16 between the flanges 17 and to be covered by a cover plate 33 which is removably secured in position by screws 34. A closed conduit is thus provided for the wires 32 and, as the invention is designed to be secured to the shank of the pedal 11 immediately below the pedal, a rest is provided for the foot by means of which the pedal is operated.

The arm 10 is channeled as shown at 35 and is provided with spaced ribs 36 having openings 37 therethrough, so that the conductor wires 32 may extend into this channel and pass through the openings 37 for connection with a suitable signal and a source of current for operating the same.

It will be apparent from the foregoing description and accompanying drawings that the invention provides a simple, readily assembled and inexpensive means which may be readily attached to an automobile control pedal for the purpose of independently controlling one or more signal circuits. The pedal 11 may be operated without operating either of the circuit closers, while either of the circuit closers may be operated independently of one another or independently of the pedal 11. One of the circuit closers may be connected to a signal to indicate a left turn and the other to a signal to indicate a right turn and by placing the foot upon the pedal 11 and depressing the proper pressure plate 31, either of the circuit closers may be operated to indicate the desired signal.

The invention is susceptible of various changes in its form, proportions and minor details of construction and the right is herein reserved to make such changes as properly fall within the scope of the appended claims.

Having described the invention what is claimed is:—

1. A foot operated circuit closer comprising an attaching arm, a clamp at one end of the arm, a bar carried by and extending at right angles from the arm, flanges extending along opposite edges of the bar, a plate secured to the bar and engaging the flanges and providing a hollow foot rest and wire conduit, and a switch at one end of the arm.

2. A foot operated circuit closer comprising an attaching arm, a clamp at one end of the arm, a bar carried by and extending at right angles from the arm, flanges extending along opposite edges of the bar, a plate secured to the bar and engaging the flanges and providing a hollow foot rest and wire conduit, and a switch at each end of the arm.

3. A foot operated circuit closer comprising an attaching arm, a clamp at one end of the arm, a foot rest carried by and disposed at right angles from the arm, a switch at one end of the arm, said switch including a base, spaced contacts carried thereby, a shank movable with respect to the base, a switch arm carried by and movable with respect to the shank, electrically connected contacts carried by the switch arm to engage the base contacts, spring means to hold the contacts disengaged and a pressure plate at the outer end of the shank.

In testimony whereof I affix my signature.

JAMES L. DROHEN.